No. 873,232. PATENTED DEC. 10, 1907.
E. F. HAYES.
DINNER PAIL AND HEATER.
APPLICATION FILED APR. 26, 1907.
2 SHEETS—SHEET 1.
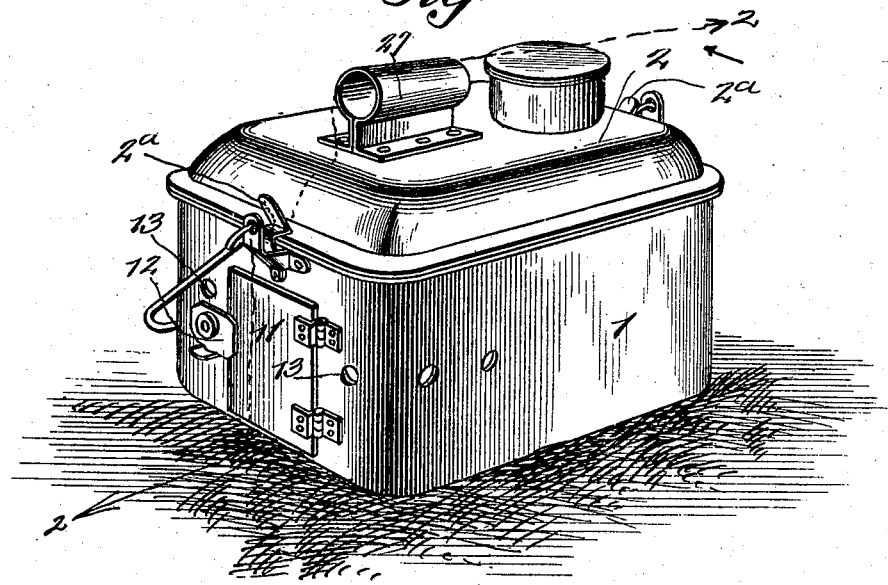
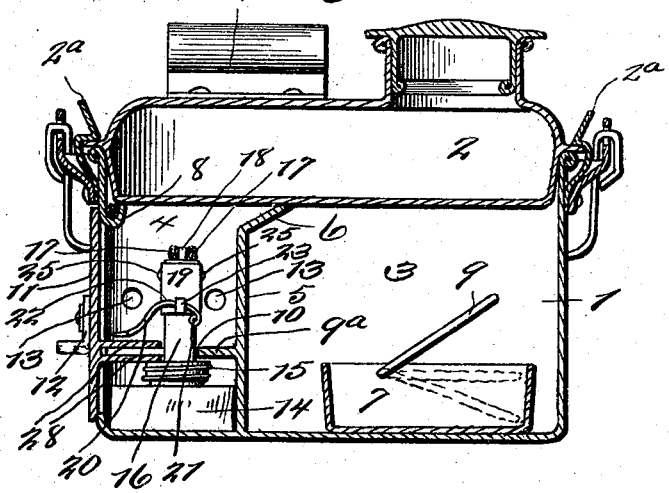
Witnesses
R. H. Boswell
M. O. Bowling
Inventor
E. F. Hayes.
By Dean Swift
Attorney

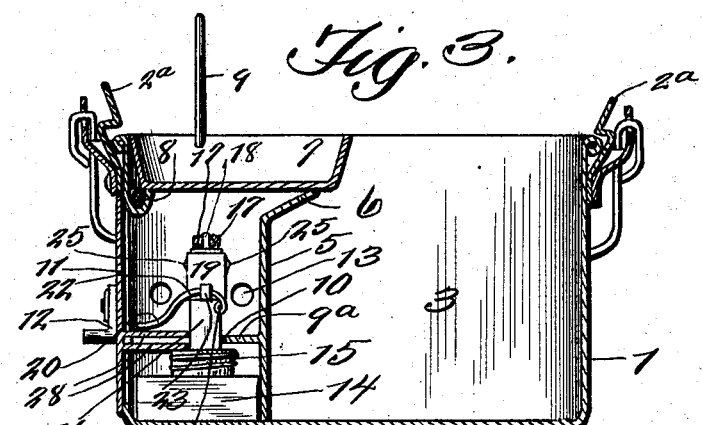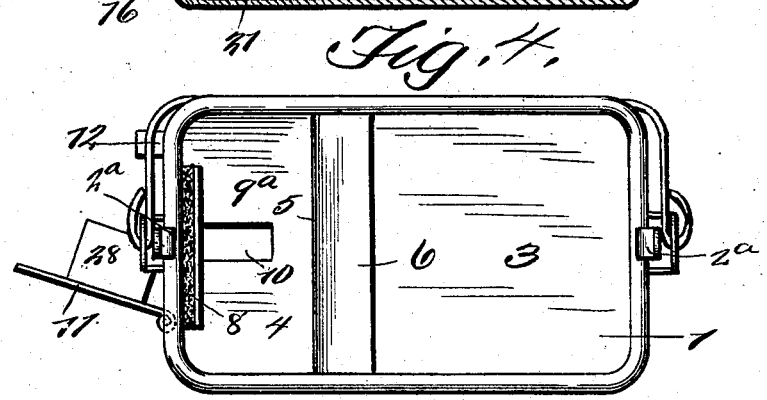

UNITED STATES PATENT OFFICE.

ELMER F. HAYES, OF KIRWIN, KANSAS.

DINNER-PAIL AND HEATER.

No. 873,232.   Specification of Letters Patent.   Patented Dec. 10, 1907.

Application filed April 26, 1907. Serial No. 370,447.

*To all whom it may concern:*

Be it known that I, ELMER F. HAYES, a citizen of the United States, residing at Kirwin, in the county of Phillips and State of Kansas, have invented a new and useful Dinner-Pail and Heater; and I do hereby declare the following to be a full, clear, and exact description of the invention, such as will enable others skilled in the art to which it appertains to make and use the same.

This invention relates to dinner pails and it has for an object to provide an improved device of this kind provided with means for heating the contents thereof.

Other and further objects will appear in the following description and will be more particularly pointed out in the appended claims.

In the drawings, Figure 1 is a perspective view of the pail. Fig. 2 is a longitudinal section with liquid container in place upon line 2—2 of Fig. 1. Fig. 3 is a longitudinal section with liquid container removed and the heating pan in place upon a similar plane as taken for Fig. 2. Fig. 4 is a top view with the liquid container and the lamp removed.

Referring more particularly to the drawings, 1 indicates the pail which is closed by a liquid or coffee container, 2. The pail is divided into a lunch compartment 3 and a heater compartment 4, by a partition 5 which is provided at its upper end with an inclined flange 6. This flange being yieldable is adapted to bear tightly against the bottom of the container 2 and thus prevent any odor passing into the lunch compartment 3 from the heater compartment 4. This flange 6 is also adapted to provide a prolonged bearing for a heating pan 7 which is adapted to be disposed over the heater compartment as shown in Fig. 3, the opposite edge of the pan resting upon a ledge 8 upon the end wall of the pail. The pan is provided with a bail 9 by which the said pan may be handled when hot, the bail being of a size to fold within the pan so that it will not occupy any space when the pan is placed in the lunch compartment. The body 1 is provided with spring clips $2^a$ which hold the container in its place, as clearly shown in the drawings.

Arranged within the heater compartment, is a lamp to be hereinafter more particularly described. To prevent the heat in the compartment 4 reaching the body of the lamp, the compartment 4 is provided with a horizontal partition $9^a$ which is provided with a recess 10 to receive the neck of the burner of the lamp. This recess opens to the adjacent end of the pail and the pail is provided with a door way closed by a door 11, serving to permit the introduction and removal of the lamp the door being held closed by a fastener 12 which may be of any suitable construction. The door 11 is provided with a horizontally disposed member 28, which is U-shaped in cross section as shown in Fig. 3 which member 28, straddles the partition $9^a$ for the purpose of closing entirely, the open end of the recess 10, that is, after the lamp has been placed in its proper position, as will be clearly observed, by reference to Figs. 2, 3 and 4. This member 28 serves three functions, first it closes the recess 10, second it holds the lamp erect and prevents the same from wabbling and third it prevents the heat above the partition $9^a$ from entering the compartment below the partition, as will be clearly manifest. While sufficient air might possibly pass in about the door when the latter is closed, yet it is preferred to provide a number of openings 13 in the pail to admit air to the burner.

The lamp before mentioned, should preferably burn alcohol, owing to the greater heat produced thereby, and to the fact that it is practically odorless. This lamp comprises a body 14 and a burner secured to the body by a screw cap 15, the cap being so positioned that it will just fit below the partition $9^a$ and thus prevent the vertical movement of the lamp. The burner consists of a tube 16 divided into three vertical and parallel compartments open at both ends. The two outside compartments contain wicks 17 formed of sheets or strips of asbestos, while the middle compartment 18 acts to conduct vapor from the lamp body.

To regulate the burner, a sleeve 19 surrounds the upper end of the burner tube and is moved above and below the upper end of the tube by a yoke 20 the free ends of which are pivoted at 21 to opposite sides of the tube and are slightly bent at 22 to pass through loops or eyes 23 on the sleeve 19. The sleeve 19 is provided with oppositely disposed lugs 25, which are adapted to frictionally engage a suitable cap, (not shown) for preventing the escape of alcohol, when the lamp is not in use. The burner tube 16 is of such a size that movement of the lamp in the recess 10, is prevented. So that the liquid container may be easily removed, when hot, it is provided with a rigid handle 27 on the top thereof.

It is apparent that with this pail one may quickly and easily warm a lunch and thus secure the pleasure of a warm meal.

Having thus described the invention, what is claimed is:

1. In a dinner pail, a partition dividing the pail into two compartments, a liquid-container closing the compartments and resting against the upper end of the partition, a doorway in one of said compartments, a horizontal portion in this latter compartment, provided with a recess opening toward the doorway and a lamp having its body beneath the horizontal partition and its burner projecting through the recess.

2. In a dinner pail, a partition dividing the pail into two compartments, a liquid container closing the compartments and resting against the upper end of the partition, a doorway in one of said compartments, a horizontally disposed partition in the latter compartment and provided with a recess opening toward the doorway, said doorway being provided with a door, having means to close the open end of said recess, and a lamp having its body beneath the horizontal partition and its burner projecting through the recess.

3. In a dinner pail, a partition dividing the same into two compartments, and provided with a yieldable flange, a liquid container closing the compartments and resting upon said flange, one of said compartments having a doorway, a door therefor, a horizontal partition in the latter compartment, a recess therein, said door having horizontally disposed U-shaped member for closing the recess and a lamp having its body beneath the horizontal partition, and its burner projecting through the recess.

4. A dinner pail, comprising two compartments, a closure therefor, one of said compartments, having a horizontally disposed partition, and provided with a doorway and door therefor, said partition having a recess therein, a lamp having its body beneath the horizontal partition and its burner projecting through the recess, said door having means for closing the recess.

In testimony whereof I have signed my name to this specification in the presence of two subscribing witnesses.

ELMER F. HAYES.

Witnesses:
 H. L. JOHN,
 EUGENE JOHN.